United States Patent [19]

Bourcier et al.

[11] Patent Number: 4,894,677
[45] Date of Patent: Jan. 16, 1990

[54] HIGH-POWER ILLUMINATION DEVICE FOR A CAMERA

[75] Inventors: Henri Bourcier, Marolles en Brie; Pierre Turon Lacarrieu, Seguy, both of France

[73] Assignee: U.S. Philips Corporation, New York, N.Y.

[21] Appl. No.: 281,574

[22] Filed: Dec. 8, 1988

[30] Foreign Application Priority Data

Dec. 18, 1987 [FR] France ................... 87 17714

[51] Int. Cl.$^4$ .............. G03B 3/00; G02B 13/16; H04N 5/225; H04N 5/30
[52] U.S. Cl. .................... 354/403; 358/225; 358/229
[58] Field of Search .............. 354/403, 132, 149.11, 354/165; 358/225, 229; 362/11; 352/49, 198, 203

[56] References Cited

U.S. PATENT DOCUMENTS

| 2,138,723 | 11/1938 | Bell | 354/132 |
| 3,821,764 | 6/1974 | Shelton | 354/132 |
| 3,958,080 | 5/1978 | Schadler | 358/229 X |
| 4,229,762 | 10/1980 | Healy | 358/225 X |
| 4,816,854 | 3/1989 | Tsuji et al. | 354/132 X |

Primary Examiner—W. B. Perkey

[57] ABSTRACT

A high-power illumination device (2) integrated with a camera (1) for measuring the direction, distance and/or attitude of two objects relative to each other, one of the objects carrying the device. For obtaining a high-power emission several elementary light sources (10) are arranged in a ring configuration around the input-optical system (7) of the camera. The light beam emitted by each source is focused via a deflecting mirror (12) onto a facet mirror (13) surrounding the input-optical system (7) and comprising as many facets as there are light sources. Each facet is inclined so as to align the direction of the reflected beam with the direction of the field of view of the camera. The beams from these facets are thus quasi-superimposed around the optical axis of the camera.

4 Claims, 2 Drawing Sheets

HIGH-POWER ILLUMINATION DEVICE FOR A CAMERA

BACKGROUND OF THE INVENTION

The invention relates to a high-power illumination device integrated with a camera for measuring the direction, distance and/or attitude of two objects relative to each other. One of the objects carries the device, and the camera images the other object on a detector via an input-optical system. The device has a plurality of elementary sources each associated with an optical system for adjusting the field of view of each source to that of the input-optical system of the camera.

A device of this type is used, for example, in encounters between two objects in space, one of which is referred to as the "hunter" which is to make contact with the other object referred to as the "target".

It is necessary that the coupling between the two objects is established with the least possible mechanical shock at the instant of contact so that the orbital conditions of the target are not modified too much.

For this purpose the hunter must take the theoretical orbit of the target into account at a sufficiently early moment in order to contact it at the right speed and particularly at the right attitude.

This requires equipment installed in the hunter and measuring the distance between the hunter and the target (for the final approach they may take up positions at, for example 200 m) the direction of the target with respect to the reference mark of the hunter and the attitude of the target with respect to this mark.

This equipment comprises a camera provided with a radiation emitter emitting a certain cone of radiation along the same axis and in the same field as that of the camera, which cone is projected onto the target on which retroreflectors have been disposed, i.e. small mirrors having three faces (or corner tubes) which return the reflected beam along itself, independent of their position in space.

A laser diodes commonly used as light emitter necessitate the use of an optical system for adapting the angle of the emitted cone to the field of view of the camera.

For spatial encounters between two objects it is necessary to use an emitter which is sufficiently powerful so that the luminous flux coming from the retroreflectors and impinging upon the camera is stronger than that emitted by the sun.

Consequently, several elementary sources each comprising a laser diode and a optical system must be used for enhancing the power of the emitter to a considerable extent. It is difficult to arrange these sources in a very small space and such that they emit in one and the same cone.

SUMMARY OF THE INVENTION

The object of the invention is to mitigate this difficulty and to provide a device wherein the fluxes of several elementary sources are coupled adequately and the high power of the emission thus realized can be modulated, which device moreover has some over-power of emission so that breakdown of one or several of the sources is not detrimental.

The elementary sources are regularly spaced in a ring configuration around the pupil of the input-optical system, the light beam from the optical system of each source being focused via a deflecting mirror arranged opposite each source onto a facet mirror surrounding the pupil of the input-optical system. The mirror has as many facets as there are light sources, each facet being inclined so as to align the direction of the reflected beam with the direction of the field of view of the camera in such a way that the light beams from the mirror facets are quasi-superimposed all around the optical axis of the camera.

DETAILED DESCRIPTION OF THE PREFERRED EMBODIMENTS

Figure 1:
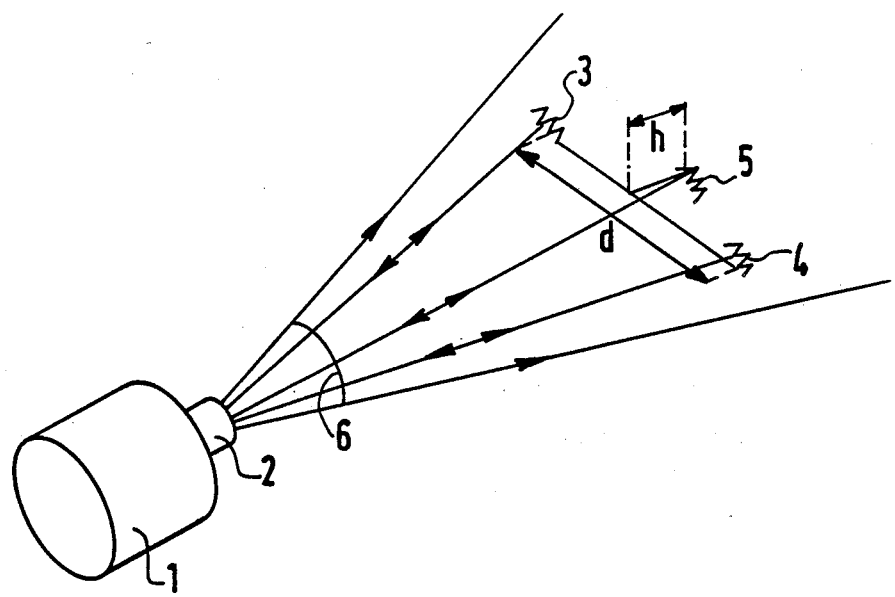
FIG. 1 illustrates the principle of the measuring device.

The distance, direction and relative attitude measurements between two objects can be realized by means of the device the principle of which is shown in FIG. 1.

One of the objects carries the camera 1 equipped with its illuminator 2 and the other object carries three regularly spaced non-coplanar retroreflector patterns 3, 4 and 5 in the emission cone 6 of the illuminator.

The parts of the beams reflected along themselves by the retroreflector patterns are indicated by lines on which arrows in opposite directions have been indicated.

The retroflectors 3 and 4 are separated by a distance d.

The retroflectors 5 is shifted by h with respect to the reflectors 3 and 4.

The camera measures the angular direction of the reflectors 3, 4 and 5.

The angular information of the central point provided by $$\frac{Pos(3) + Pos(4)}{2}$$

provides the direction of the retroreflector, thus the direction of the object carrying the retroreflectors.

The distance between camera and retroreflector patterns is provided by measuring the angle at which the distance d from the camera is viewed.

The relative attitude between the two objects can be determined by the angular space between the retroreflector 5 and the virtual central point of the distance d separating the patterns 3 and 4.

Figure 2:
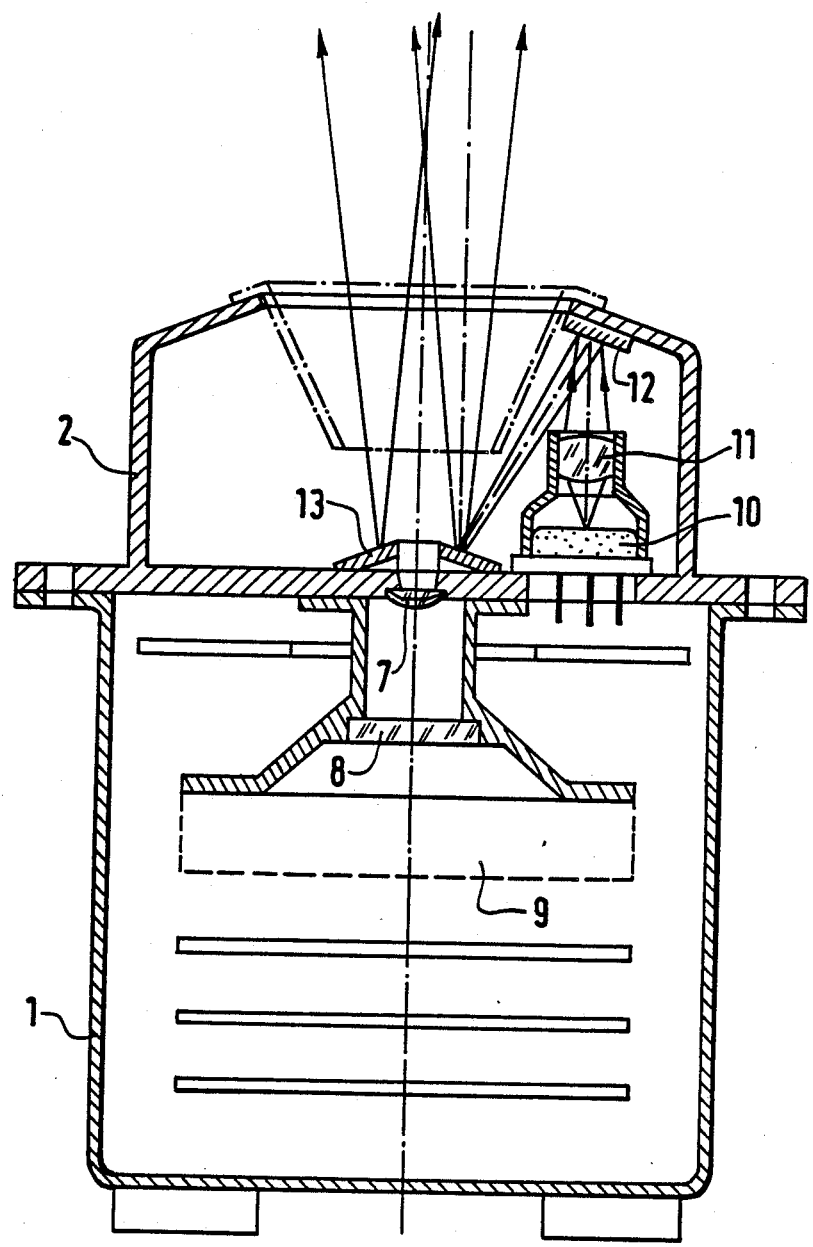
FIG. 2 is a longitudinal section through the illuminator according to the invention, associated with the camera.

A longitudinal section of the illumination device according to the invention is shown diagrammatically in FIG. 2 illustrating the optical head of a camera for a spatial encounter.

The input-optical system of the camera 1 comprises the entrance pupil 7 and the optical filter 8 which focus the image of the scene on a detector 9 comprising, for example a charge-coupled device the temperature of which is kept for example at 20°±3° by means of for example a Peltier element.

The illumination device 2 according to the invention is arranged in front of the camera 1 and its principle is to image of emissive surfaces of an assembly of laser diodes onto a mirror having facets which are concentric with the optical system of the camera. This principle has the advantage that all direct light diffusion in the said optical system of the camera is avoided.

The device according to the invention comprises N elementary sources 10 (continuous wave laser diodes or pulsed laser diodes) spaced in a ring configuration around the entrance pupil 7 of the optical system of the camera. For each source 10 an optical system 11 operating with an elementary source is provided for adapting the emission field to the desired field of view. The light beam emitted by the optical system 11 is focused by means of a deflecting mirror 12 arranged opposite each source onto a mirror 13 having N facets surrounding the entrance pupil 7 of the camera. Each facet of this mirror is inclined so as to return the beam of the corresponding elementary source in a direction which is aligned with the direction of the field of view of the camera.

The light beams are thus quasi-concentric with the optical axis of the camera.

Moreover, no high-power light beam impinges on the optical components (entrance pupil, filter) or traverses them in the path of the field of view of the camera, which diminishes the risks of diffusion and thus the risks of direct injection of parasitic light.

Modulation of the emission level becomes possible by using 1 to N elementary sources.

With this illumination device strong luminous fluxes can be generated ensuring a correct operation of the camera, even in a very bright atmosphere, (such as sun-radiation in the field of view when the camera is used for spatial encounters or in very luminous environments in robot applications). The illumination device according to the present application can also be used in vision systems for robots and generally in all applications wherein a combination of a camera and an illumination device is used.

What is claimed is:

1. A high-power illumination device integrated with a camera for measuring the direction, distance and/or attitude of two objects relative to each other, whilst one of said objects carries the device, which camera images the other object on a detector via an input-optical system, said device comprising a plurality of elementary sources each associated with an optical system for adjusting the field of view of each source to that of the input-optical system of the camera, characterized in that said elementary sources are regularly spaced in a ring configuration around the pupil of said input-optical system, the light beam from the optical system of each source being focused via a deflecting mirror arranged opposite each source onto a facet mirror surrounding the pupil of the input-optical system and comprising as many facets as there are light sources, each facet being inclined so as to align the direction of the reflected beam with the direction of the field of view of the camera in such a way that the light beams from the said mirror facets are quasi-superimposed all around the optical axis of the camera.

2. An illumination device as claimed in claim 1, characterized in that the elementary sources comprise continuous wave laser diodes or pulsed laser diodes.

3. An illumination device as claimed in claim 2, characterized in that none of the beams emitted by the elementary sources traverses the input-optical system of the camera.

4. An illumination device as claimed in claim 1, characterized in that the illumination level can be modulated by using 1 to N elementary sources.

* * * * *